(12) United States Patent
Creasman et al.

(10) Patent No.: US 11,502,899 B2
(45) Date of Patent: *Nov. 15, 2022

(54) DYNAMIC PRODUCT INSTALLATION BASED ON USER FEEDBACK

(71) Applicant: International Business Machines Corporation, Armonk, NY (US)

(72) Inventors: James D. Creasman, Apex, NC (US); Kevin D. Dillard, Holly Springs, NC (US); Jeffrey K. Johnson, Greensboro, NC (US); Barry J. Pellas, Durham, NC (US); Matthew T. Pellas, Raleigh, NC (US); Matthew K. Thomas, Raleigh, NC (US); Paul A. Titus, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/587,288

(22) Filed: Sep. 30, 2019

(65) Prior Publication Data

US 2020/0028743 A1 Jan. 23, 2020

Related U.S. Application Data

(63) Continuation of application No. 15/614,410, filed on Jun. 5, 2017, now Pat. No. 10,594,550, which is a (Continued)

(51) Int. Cl.
*H04L 41/0806* (2022.01)
*H04L 41/084* (2022.01)
*H04L 41/08* (2022.01)

(52) U.S. Cl.
CPC ........ *H04L 41/0806* (2013.01); *H04L 41/084* (2013.01); *H04L 41/0883* (2013.01)

(58) Field of Classification Search
CPC .......................... H04L 41/0806; H04L 41/084; H04L 41/0883
See application file for complete search history.

(56) References Cited

U.S. PATENT DOCUMENTS 8,136,090 B2   3/2012   Boss et al.
8,295,452 B1  10/2012   Trandal et al.
(Continued)

FOREIGN PATENT DOCUMENTS

CN   103186388    7/2013
WO   2006029259   3/2006
(Continued)

OTHER PUBLICATIONS

Tulisalo, Tommi, et al.; Distributing Notes Clients Automatically; IBM Redbook; International Technical Support Organization; Jul. 2003.

*Primary Examiner* — Chris Parry
*Assistant Examiner* — Steven C Nguyen
(74) *Attorney, Agent, or Firm* — Edward J. Wixted, III

(57) ABSTRACT

A method and technique for utilizing user feedback of product installation includes initiating, on a client computing system by a user, an install module of a product to install an instance of the product on the client computing system according to a default installation process. The install module interfaces with a server system and retrieves feedback data collected by the server system in connection with prior installations of the product. The install module creates a modified installation sequence for the product on the client computing system from the default installation process based on the retrieved feedback data and then installs the instance of the product on the client computing system according to the modified installation process.

3 Claims, 4 Drawing Sheets

Related U.S. Application Data continuation of application No. 14/108,778, filed on Dec. 17, 2013, now Pat. No. 9,680,697.

(56) References Cited

U.S. PATENT DOCUMENTS

| | | | |
|---|---|---|---|
| 8,386,336 B1 | 2/2013 | Fox et al. | |
| 2004/0002301 A1* | 1/2004 | Ross | G09B 7/02 455/2.01 |
| 2005/0097547 A1* | 5/2005 | Ramachandran | G06F 8/61 717/177 |
| 2006/0123414 A1 | 6/2006 | Fors et al. | |
| 2007/0233717 A1* | 10/2007 | Prabhakar | G06F 8/61 |
| 2007/0245340 A1 | 10/2007 | Cohen et al. | |
| 2008/0005548 A1 | 1/2008 | Alfandary et al. | |
| 2008/0148255 A1 | 6/2008 | Ramachandran et al. | |
| 2008/0201705 A1* | 8/2008 | Wookey | G06F 8/658 717/175 |
| 2008/0301112 A1 | 12/2008 | Wu | |
| 2009/0007097 A1* | 1/2009 | Hinton | G06F 8/61 717/176 |
| 2009/0089778 A1* | 4/2009 | Craft | G06F 8/61 717/174 |
| 2009/0313534 A1 | 12/2009 | Davis et al. | |
| 2010/0031248 A1 | 2/2010 | Sonkin et al. | |
| 2010/0094822 A1 | 4/2010 | Kelapure | |
| 2010/0186009 A1* | 7/2010 | Sen | G06F 8/61 717/174 |
| 2011/0239212 A1* | 9/2011 | Wookey | G06F 8/658 717/178 |
| 2012/0284704 A1 | 11/2012 | Friedman et al. | |
| 2013/0194607 A1* | 8/2013 | Jones | G06K 15/002 358/1.14 |
| 2013/0346956 A1 | 12/2013 | Green et al. | |
| 2014/0026130 A1 | 1/2014 | Hehir et al. | |
| 2014/0096136 A1 | 4/2014 | Duan et al. | |
| 2015/0227354 A1 | 8/2015 | Wang | |

FOREIGN PATENT DOCUMENTS

| | | |
|---|---|---|
| WO | 2006096252 | 9/2006 |
| WO | 2007134373 | 11/2007 |
| WO | 2009088308 | 7/2009 |
| WO | 2009109466 | 9/2009 |

* cited by examiner

DYNAMIC PRODUCT INSTALLATION BASED ON USER FEEDBACK

BACKGROUND

When a product is installed on a data processing system (e.g., a software and/or hardware product), the product generally includes a routine executed for installing the product. During product installation on the data processing system, a user may be presented by the routine with various options and/or prompts associated with the installation, such as acceptance of license terms, where to install certain data and/or files, whether a default/standard or custom installation path is desired, etc. Sometimes, if a step in the installation process does not complete as expected or results in a manner slightly different than documented, the user may attempt to retrieve assistance from a product support helpdesk or third party website, such as a message board.

BRIEF SUMMARY

According to one aspect of the present disclosure a method and technique for dynamic product installation based on user feedback is disclosed. The method includes initiating, on a client computing system by a user, an install module of a product to install an instance of the product on the client computing system according to a default installation process. The install module interfaces with a server system and retrieves feedback data collected by the server system in connection with prior installations of the product. The install module creates a modified installation sequence for the product on the client computing system from the default installation process based on the retrieved feedback data and then installs the instance of the product on the client computing system according to the modified installation process.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
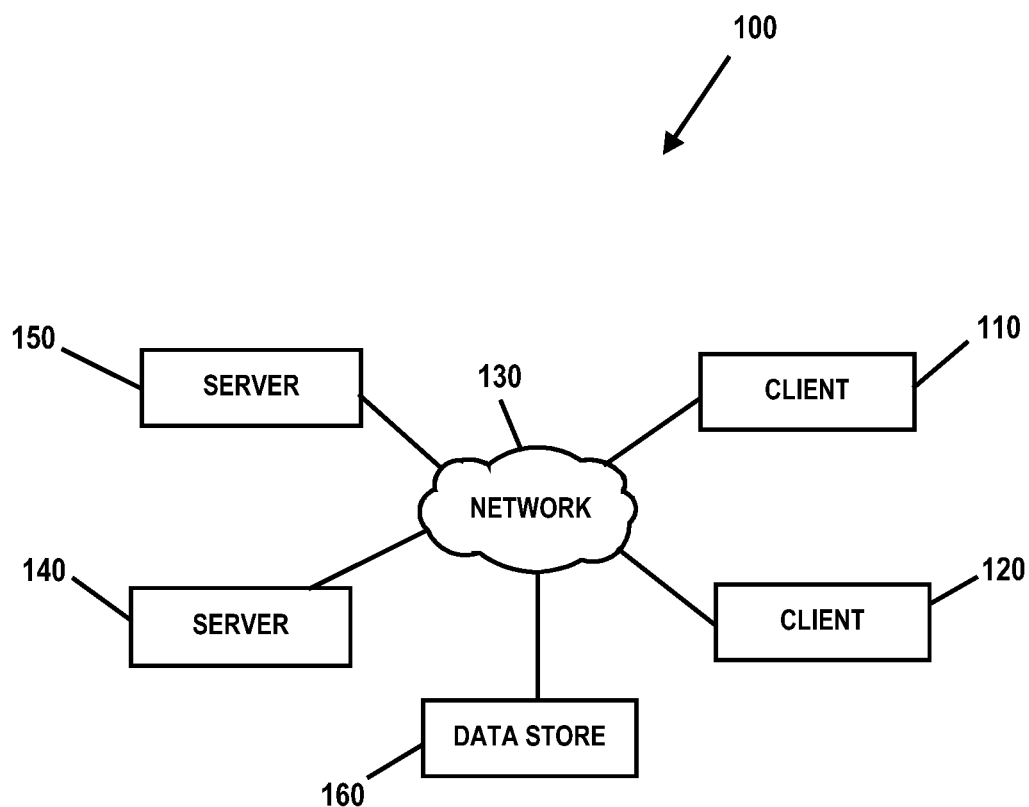
FIG. 1 is an embodiment of a network of data processing systems in which the illustrative embodiments of the present disclosure may be implemented.

Embodiments of the present disclosure provide a method, system and computer program product for dynamic product installation based on user feedback. For example, in some embodiments, the method and technique utilizes user feedback corresponding to a previous install of a product to assist and/or modify future installations of the product. The feedback of previous users/installers may be retrieved in real time upon initiating an install of the product such that the installing user may view the comments/feedback of previous installers while currently installing the product (e.g., displayed to the user at different corresponding stages of the installation process/sequence). The code/routine for installing the product may automatically access a remote data source for previous install feedback information. In some embodiments, the feedback of previous users/installs may be used to modify a default installation path for the product. For example, in some embodiments, feedback received from previous users/installs may indicate that certain installation steps are favored or disfavored. An install module may evaluate/analyze the user feedback and automatically determine whether certain steps of a default installation path for the product should be modified. The code/routine used to install the product may retrieve the information for the installation path and automatically modify the default installation path for the product based on user feedback from previous installs. Thus, embodiments of the present may include: initiating an installation process to install an instance of a product, by an install module of the product, on a client computing system of a first user; interfacing, by the install module, with a server system to retrieve install path data defining a default installation path for the product, the default installation path based on previous feedback data received from at least a second user previously installing another instance of the product; modifying, by the install module, a default installation path for the product on the client computing system of the first user using the install path data; during the installation process, obtaining current feedback data from the first user corresponding to the installation process on the client computing system of the first user; and transmitting the current feedback data to the server system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
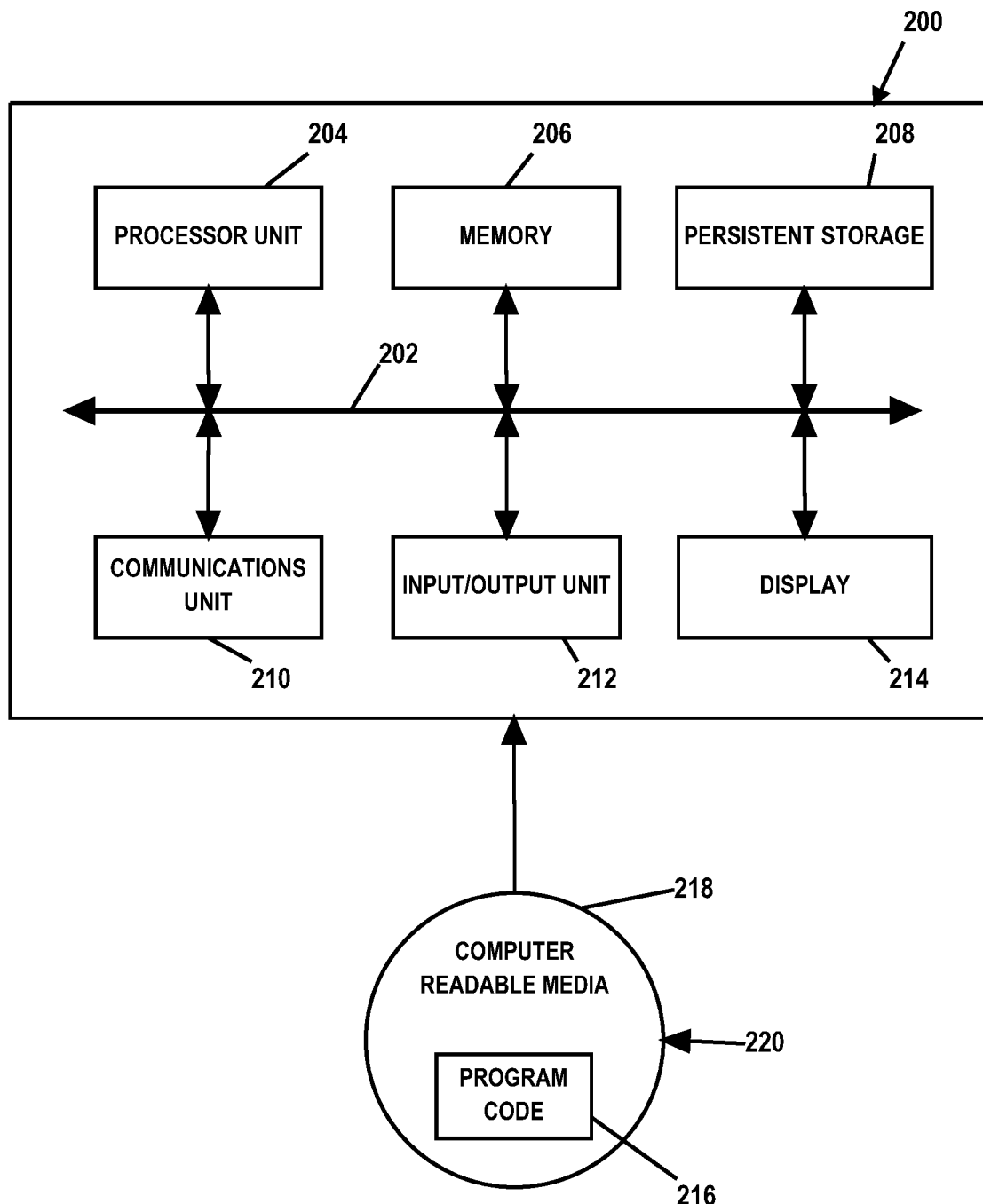
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM® Power Systems™ servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for dynamic product installation based on user feedback according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
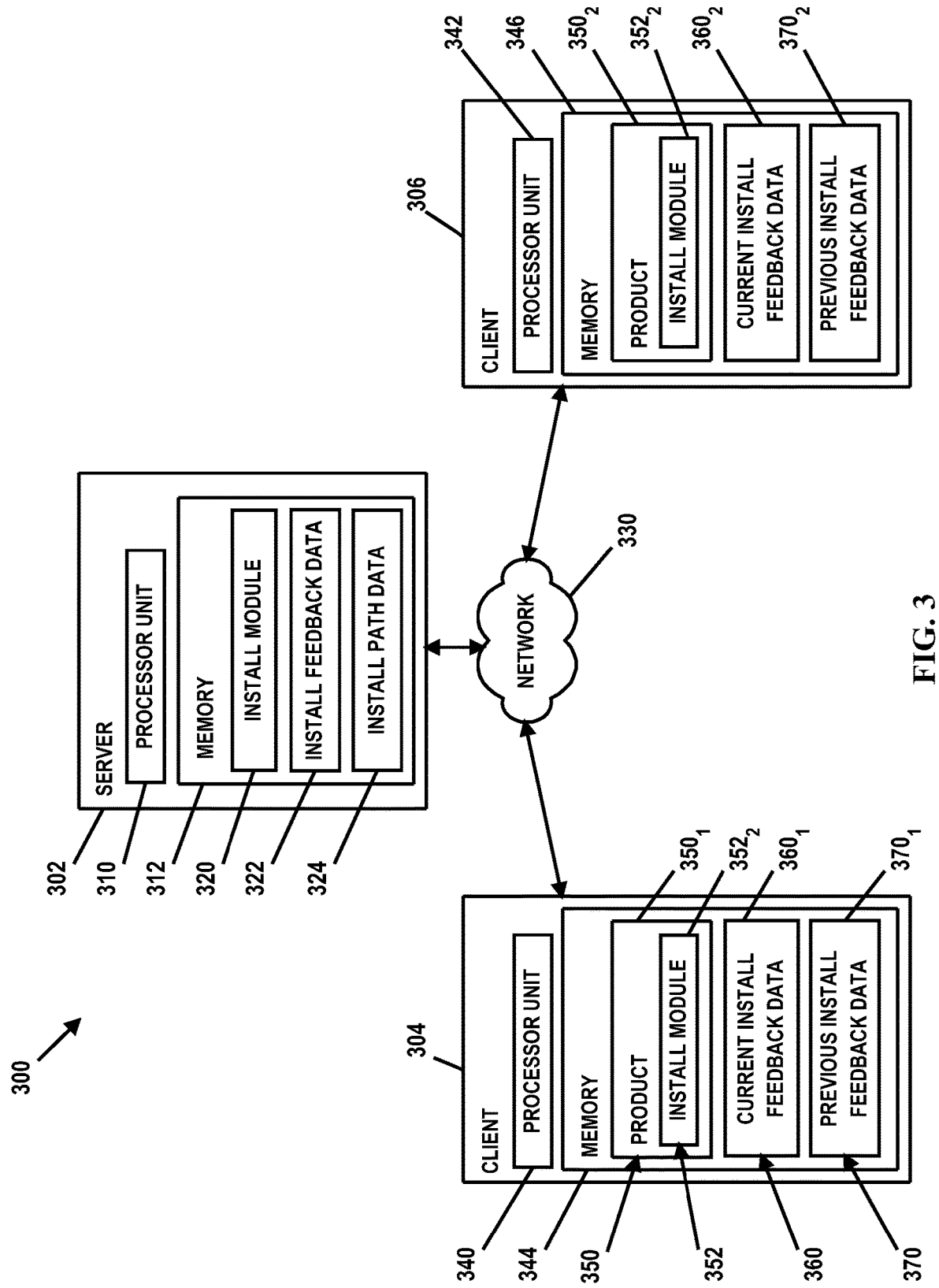
FIG. 3 is a diagram illustrating an embodiment of a computing environment in which illustrative embodiments of a system for identity service management in limited connectivity environments according to the present disclosure may be implemented.

FIG. 3 is a diagram illustrating a computing environment in which an embodiment of a system 300 for dynamic product installation based on user feedback according to the present disclosure may be implemented. In the illustrated embodiment, system 300 includes a server 302 and clients 304 and 306. Server 302 and clients 304 and 306 may comprise data processing platforms such as servers 140 and 150 and clients 110 and 120, respectively, or may comprise any other type of data processing platform such as system 200. In the illustrated embodiment, server 302 includes a processor unit 310 and a memory 312. In memory 312 resides an install module 320, install feedback data 322 and install path data 324. However, it should be understood that install module 320, install feedback data 322 and install path data 324 may be stored at different locations. Install feedback data 322 comprises information collected from clients 304 and/or 306 (or users of clients 304 and/or 306) in connection with the installation of a particular product (e.g., a software application, hardware component, some combination thereof, etc.) on clients 304 and/or 306. Install path data 324 comprises information and/or instructions for modifying an installation path/sequence for a product based on feedback data 322.

Install module 320 is configured to retrieve/receive feedback data and export feedback data (or otherwise make feedback data 322 available) to subsequent users installing the product. In some embodiments, install module 320 analyzes feedback data 322 and automatically modifies an installation path/sequence for subsequent installations of the product based on feedback of users collected based on previous installs of the product. Install module 320 may be implemented in any suitable manner using known techniques that may be hardware-based, software-based, or some combination of both. For example, install module 320 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

In the illustrated embodiment, clients 304 and 306 are communicatively coupled to server 302 via a network 330 (e.g., such as network 130). Clients 304 and 306 include respective processor units 340 and 342 and memories 344 and 346. Respective memories 344 and 346 include an instance of a product 350 (e.g., product $350_1$ on client 304 and product $350_2$ on client 306). Each product 350 includes an install module 352 (e.g., install module $352_1$ on client 304 and install module $352_2$ on client 306). Install module 352 may be implemented in any suitable manner using known techniques that may be hardware-based, software-based, or some combination of both. For example, install module 352 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Install module 352 is configured to facilitate installation of product 350 on a respective client 304/306. For example, install module 352 may comprise code and/or files that are processed/extracted to facilitate the installation of product on a respective client 304/306. Install module 352 may present an interface to the user to display/collect information and/or guide the user through the installation process for product 350 such as, but not limited to, accepting license terms, selecting a "typical" or "custom" installation for product 350, selecting a directory for various product 350-related files/components, etc. According to the present disclosure, install module 352 is configured to display feedback prompts (e.g., in the form of queries, "like" and "dislike" input icons, open-ended requests for information, etc.) at various stages/points during installation of product 350 and collect responses or feedback to such prompts (e.g., register clicks of feedback prompts, collect and store rich-text field inputs, etc.). In the illustrated embodiment, the collected feedback is depicted as current install feedback data 360 (e.g., current install feedback data $360_1$ on client 304 and current install feedback data $360_2$ on client 306). Thus, while a user is installing product $350_1$ on client 304, the user is queried for installation feedback. The queries may be related to the installation environment, whether certain steps in the installation process were clear to and/or understood by the user, whether the user liked/disliked certain installation steps or the order/sequence of installation, whether the user encountered problems/difficulties with particular steps of the installation process, etc. In some embodiments, install module 352 is configured to collect the feedback data 360 and transmit/communicate feedback data 360 to server 302 (e.g., stored in server 302 as install feedback data 322). In some embodiments, the feedback data 360 is communicated to server 302 in real time or near real time; however, it should be understood that install module 352 may also be configured to collect all and/or portions of feedback data 360 and transmit all or portions of feedback data 360 to server 302 as a batch of information (e.g., a single transfer or a series of transfers taking place at various stages of the installation process). Install module 352 may also be configured to save the collected feedback data 360 as metadata to the product 350.

The feedback data 360 is then made available for subsequent installs of product 350 (e.g., by the same or other users). For example, in some embodiments, install module 352 is instrumented with code that, during the installation process of product 350, displays feedback information collected from previous installations of product 350. For example, in the illustrated embodiment, memories 344 and 346 also comprise previous install feedback data 370 (e.g., previous install feedback data $370_1$ on client 304 and previous install feedback data $370_2$ on client 306). In some embodiments, during the installation process of product 350, install module 352 communicates with server 302 and retrieves/obtains install feedback data 322 (e.g., comprising feedback resulting from previous installs of product 350) and displays the previous install feedback information (i.e., previous install feedback data 371) to the user. Thus, during the installation process, the user may view comments/feedback from other users that have previously performed the installation process for product 352.

As an example, consider that a user of client 304 installs product $350_1$ on client 304. During the installation process, install module $352_1$ may display feedback data $371_1$ corresponding to previous installs of product 350 (e.g., installs performed by other users on other machines/systems) by retrieving the feedback data $371_1$ from server 302 (e.g., feedback data 322). In some embodiments, server 302 may be associated with a social networking website where other users may have directly uploaded/posted feedback or comments on their installation of the product 350 (e.g., instead of the feedback data 360 being collected by install module 352). For example, in some embodiments, install feedback data 322 may reside on at least two different server systems (e.g., one server system may use feedback data to modify a default installation path where the other server may comprise a social networking site where other users have posted their feedback). Thus, feedback data 322 may reflect feedback from a number of different users that have previously installed instances of product 350 on their respective machines/clients. Additionally, a user of client 304 may input current install feedback $360_1$ while installing product $350_1$ and the user's feedback information will be uploaded to server 302 (e.g., stored as install feedback data 322) such the client 304 user's feedback will be available for subsequent users/installers to see/view (e.g., a user of client 306 if installing product $350_2$ subsequent to the user of client 304).

In some embodiments, install feedback data 322 is analyzed by install module 320 to vary and/or modify a "typical" or "standard" installation path for product 350. For example, in some embodiments, install module 352 may invoke certain feedback prompts/requests in response to a "custom" installation being selected by a user. The "custom" installation may include providing the user/installer with various options for the installation and/or otherwise enabling the user to customize the installation of product 350 (e.g., installing only select modules/components, selecting certain directories for files/components, selecting various installation/operating parameters, etc.). During the custom installation process (e.g., at various steps/stages or the conclusion of various steps/stages of the installation path), install module 352 may request/prompt the user to input feedback data 360 reflecting whether various features, options and/or steps of the installation process were as expected, successful, liked, disliked, etc. Feedback data 360 is delivered to server 302 for analysis by install module 320. For example, in some embodiments, and the end or processing or conclusion of the installation process, install module 352 may tally those processing steps that were liked and/or disliked and communicate the tallied information to server 302. Install module 320 may be configured to assess the received feedback information (e.g., install feedback data 322) to determine whether modifications to a "typical" or "standard" installation path (e.g., a non-customized path) should be made. For example, install module 320 may assess over time which installation steps where most liked and/or most disliked and modify the typical installation path for product 350 to include those steps that were liked the most and/or exclude those steps that were disliked the most. The modification information for the installation path for product 350 may be stored as install path data 324.

In some embodiments, in response to install module 352 preparing to initiate an installation process for product 350, install module 352 may interface with server 302 and download install path data 324 for any modifications to the installation path/sequence (e.g., code changing the installation path for a typical installation), thereby providing a dynamic modification to the typical installation path for product 350 based on user feedback on previous custom installations of product 350. Thus, install module 320 may inspect the installation paths taken by previous users/installers for product 350 and determine a most favored/liked installation path for the product to create and/or modify a default installation path for product 350.

Figure 4:
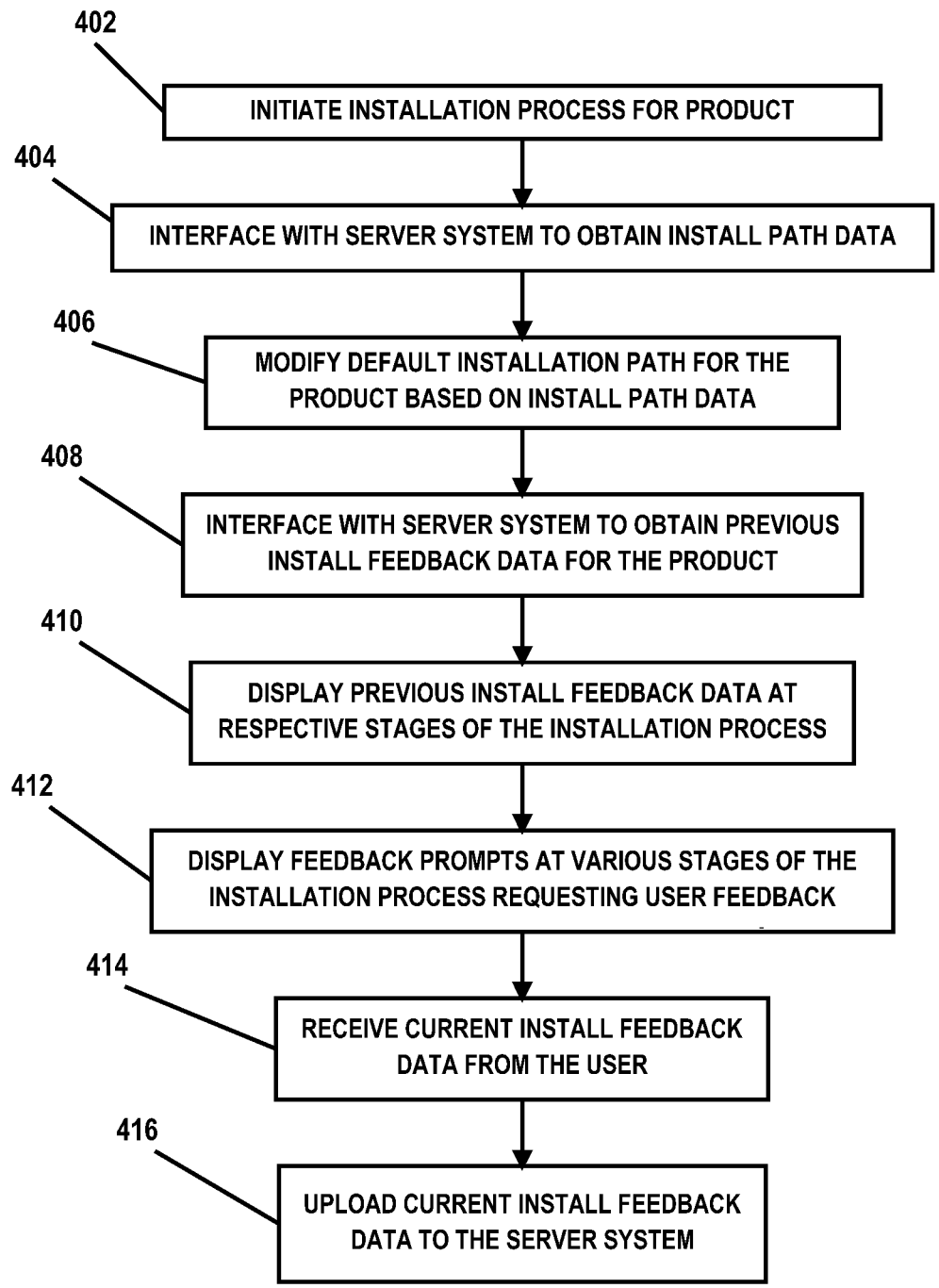
FIG. 4 is a flow diagram illustrating an embodiment of a method for identity service management in limited connectivity environments according to the present disclosure.

FIG. 4 is a flow diagram illustrating an embodiment of a method for dynamic product installation based on user feedback according to the present disclosure. The method begins at block 402, where install module 352 initiates an installation process for product 350. At block 404, install module 352 interfaces with server system 302 to obtain install path data 324 indicating a default installation path for the product 350 based on feedback obtained from other product 350 installs occurring previously. At block 406, install module 352 modifies a default installation path for the product 350 based on install path data 324. At block 408, install module 352 interfaces with server system 302 to obtain previous install feedback data 322/370 for the product 350.

At block 410, install module 352 displays previous install feedback data 370 at respective/various stages of the installation process of the product 350, thereby enabling the installing user to view feedback/comments provided by other users that have previously installed instances of the product 350. At block 412, install module 352 displays feedback prompts at various stages of the installation process requesting user feedback (e.g., current install feedback data 360). At block 414, install module 352 receives current install feedback data 360 from the user. At block 416, install module 352 uploads current install feedback data 360 to the server system 302, which may then be used by install module 320 to determine whether to modify future default installation paths for the product and/or combine the current installing user's feedback with other previously obtained feedback for display to other subsequent installers of the product 350.

Thus, embodiments of the present disclosure provide a technique to utilize user feedback corresponding to an install of a product to assist and/or modify future installations of the product. The feedback of previous users/installers may be retrieved in real time upon initiating an install of the product such that the installing user may view the comments/feedback of previous installers while currently installing the product (e.g., displayed to the user at different corresponding stages of the installation process/sequence). Further in some embodiments, the feedback of previous users/installs may be used to modify a default installation path for the product. For example, in some embodiments, feedback received from previous users/installs may indicate that certain installation steps are favored or disfavored. An install module may evaluate/analyze the user feedback and automatically determine whether certain steps of a default installation path for the product should be modified.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, comprising:
   initiating, on a client computing system by a user, an install module of a product to install an instance of the product on the client computing system according to a default installation process;
   interfacing, by the install module, with a server system;
   retrieving, by the install module from the server system, feedback data in real time, the feedback data collected by the server system in connection with prior installations of the product;
   creating, by the install module, a modified installation process for the product on the client computing system from the default installation process based on the retrieved feedback data;
   installing, by the install module, the instance of the product on the client computing system according to the modified installation process;
   querying, by the install module, the user to obtain feedback data from the user associated with the modified installation process, wherein the modified installation process includes providing the user with various options for the installation and enabling the user to customize the installation of the product, wherein the modified installation process automatically modifies an installation path for subsequent installations of the product based on the feedback data collected based on previous installs of the product, the feedback data reflecting whether various features, options and steps of the modified installation process are as expected;
   collecting, by the install module, from the user, feedback data associated with the modified installation process;
   communicating the feedback data collected from the user to the server system in real time;

displaying, by the install module, feedback prompts at various stages of the modified installation process to collect feedback data from the user associated with the modified installation process; and saving, by the install module, the feedback data collected from the user as metadata to the product.

2. A system, comprising:

a client computing system having a memory and a processor unit, the processor unit configured to execute an install module of a product to:

install an instance of the product on the client computing system according to a default installation process;

interface with a server system;

retrieve from the server system feedback data in real time, the feedback data collected by the server system in connection with prior installations of the product;

create a modified installation process for the product on the client computing system from the default installation process based on the retrieved feedback data;

install the instance of the product on the client computing system according to the modified installation process;

query a user installing the instance to obtain feedback data from the user associated with the modified installation process, wherein the modified installation process includes providing the user with various options for the installation and enabling the user to customize the installation of the product, wherein the modified installation process automatically modifies an installation path for subsequent installations of the product based on the feedback data collected based on previous installs of the product, the feedback data reflecting whether various features, options and steps of the modified installation process are as expected;

collect from the user installing the instance feedback data associated with the modified installation process;

communicate the feedback data collected from the user to the server system in real time;

display feedback prompts at various stages of the modified installation process to a user installing the instance to collect feedback data associated with the modified installation process; and save the feedback data collected from the user as metadata to the product.

3. A computer program product for product installation, the computer program product comprising:

a non-transitory computer readable medium having computer readable program code embodied therewith, the computer readable program code configured to:

install an instance of a product on a client computing system according to a default installation process;

interface with a server system;

retrieve from the server system feedback data in real time, the feedback data collected by the server system in connection with prior installations of the product;

create a modified installation process for the product on the client computing system from the default installation process based on the retrieved feedback data;

install the instance of the product on the client computing system according to the modified installation process;

query a user installing the instance to obtain feedback data from the user associated with the modified installation process, wherein the modified installation process includes providing the user with various options for the installation and enabling the user to customize the installation of the product, wherein the modified installation process automatically modifies an installation path for subsequent installations of the product based on the feedback data collected based on previous installs of the product, the feedback data reflecting whether various features, options and steps of the modified installation process are as expected;

collect from the user installing the instance feedback data associated with the modified installation process;

communicate the feedback data collected from the user to the server system in real time;

display feedback prompts at various stages of the modified installation process to the user installing the instance to collect feedback data associated with the modified installation process; and save the feedback data collected from the user as metadata to the product.

* * * * *